May 18, 1948.　　　　F. B. MILLER　　　　2,441,829
FILM VIEWING APPARATUS
Filed Aug. 6, 1945　　　　3 Sheets-Sheet 2
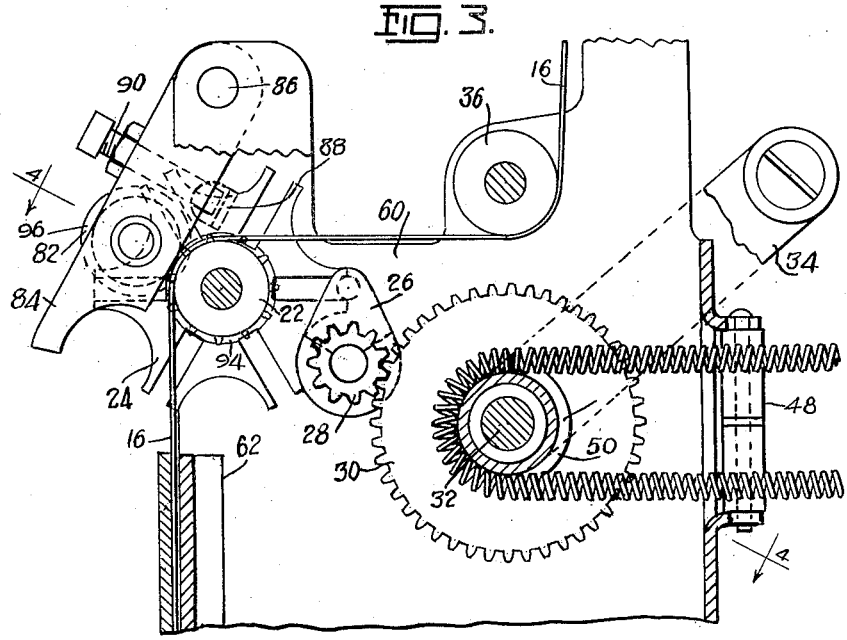
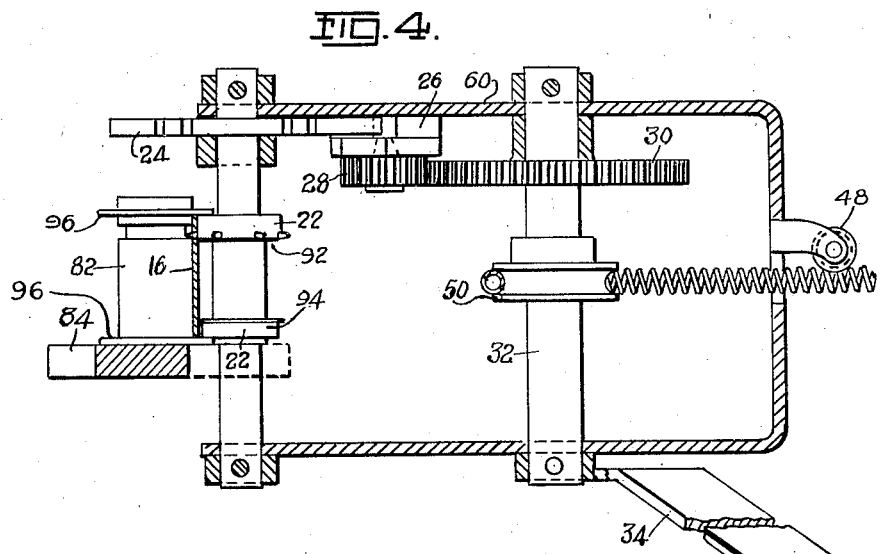
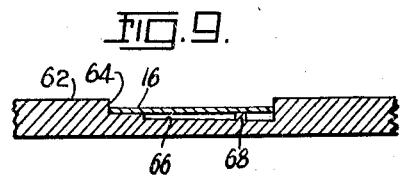
INVENTOR
FRANCIS B. MILLER,
BY
Toulmin & Toulmin
ATTORNEYS

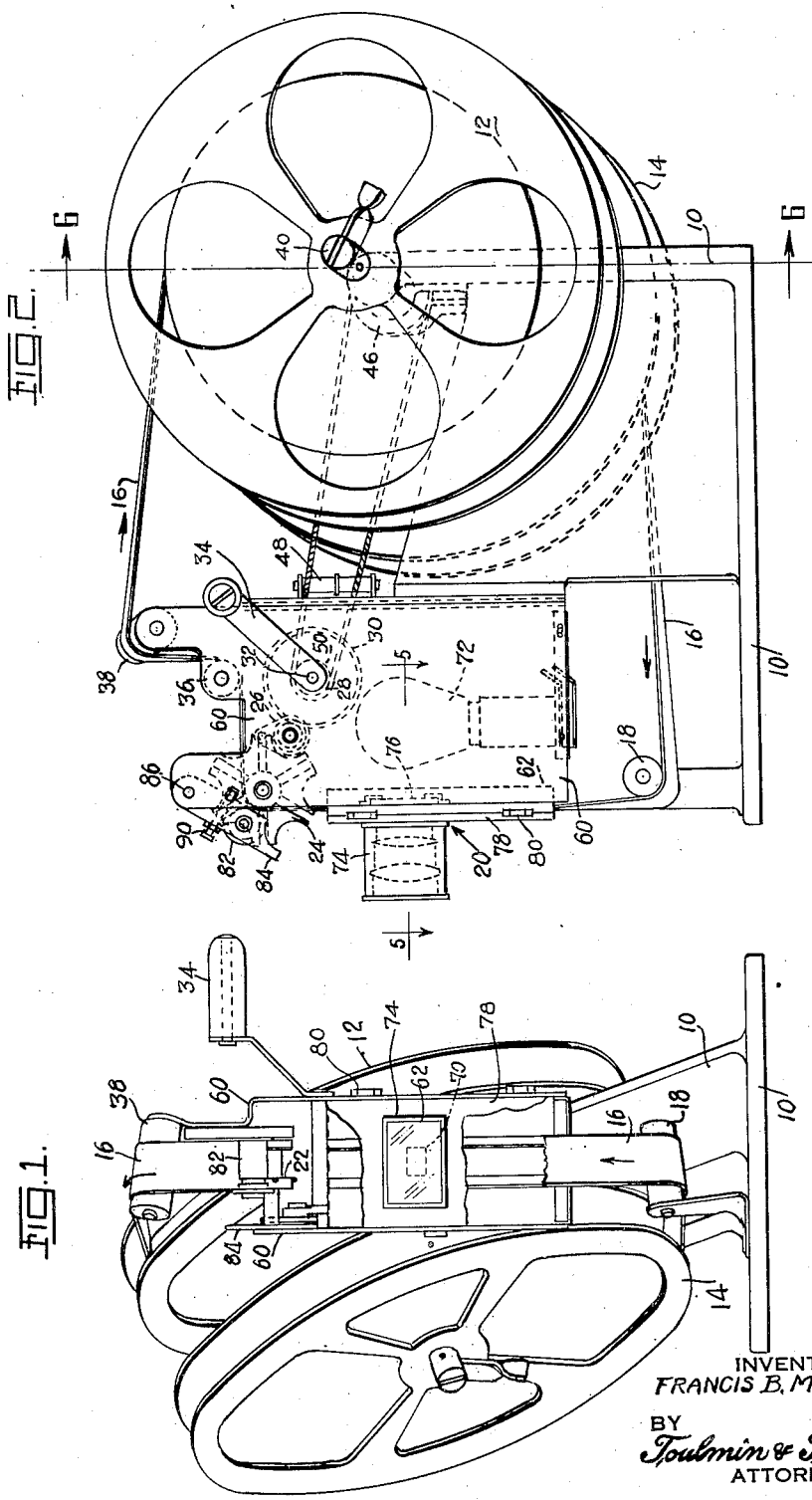

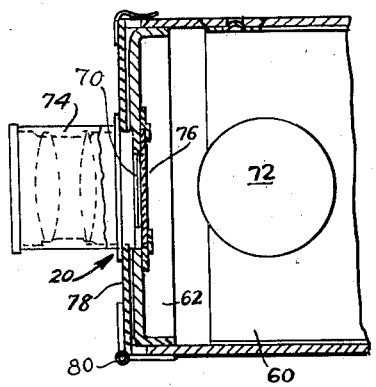
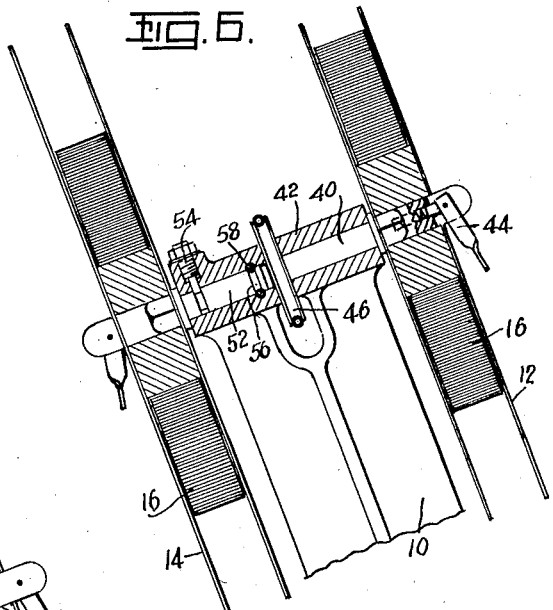
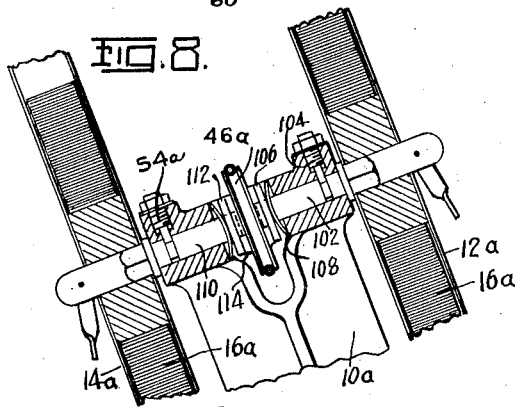
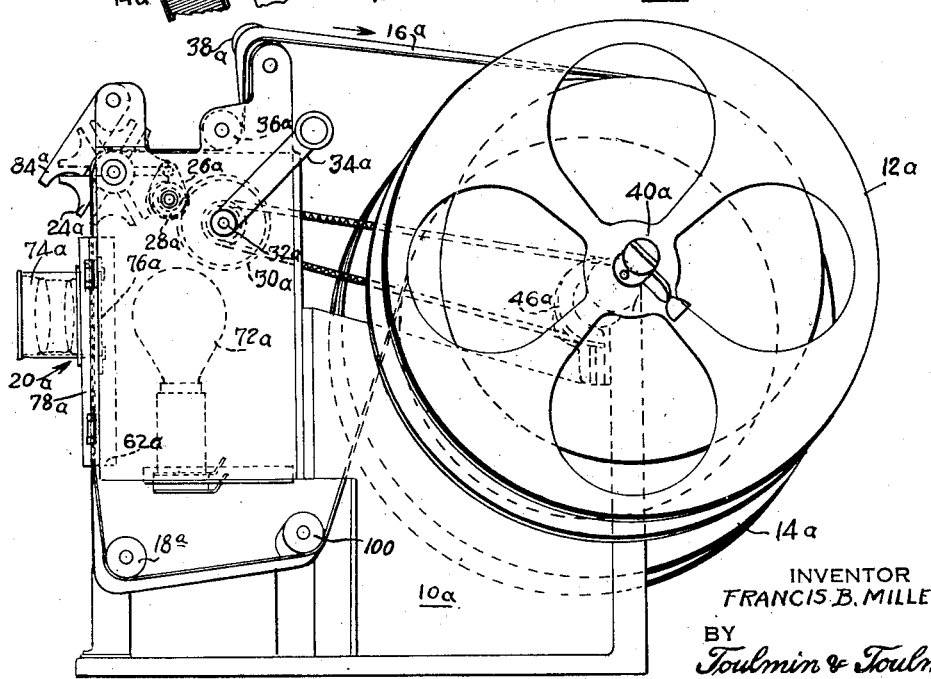

Patented May 18, 1948

2,441,829

UNITED STATES PATENT OFFICE 2,441,829

FILM VIEWING APPARATUS

Francis B. Miller, Dayton, Ohio, assignor to The W. W. Boes Company, Dayton, Ohio, a corporation of Ohio Application August 6, 1945, Serial No. 609,079

6 Claims. (Cl. 88—17)

This invention relates to photographic equipment and particularly to an apparatus for viewing films.

An object of this invention is to provide a viewer for films such as 8 and 16 mm. moving picture films which will be economical to manufacture and assemble.

Another object is to provide a film viewer according to the foregoing object which eliminates shutters or intermittent flashes of light.

Still another object of this invention is to provide a method of viewing motion picture film by intermittently moving the same thereby to eliminate shutters and intermittent light flashes which are usually employed for illuminating the film only when it is in alignment with the viewing lenses.

Still another object is to provide a film viewer or film editing device having a pay-off and a take-up reel mounted on a common support.

A further object of this invention is to provide a film viewer so arranged that the image is upright as viewed, eliminating the necessity for inverting the said image through elaborate lens systems.

Another object is to provide a novel drive means to the pay-off and take-up reels so that the latter is driven at the proper speed while the former is braked, this being accomplished through one and the same shaft.

These and other objects and advantages will become more apparent upon reference to the accompanying drawings in which:

Figure 1 is a front view of the improved film viewer according to this invention;

Figure 2 is a side view of the device shown in Figure 1;

Figure 3 is an enlarged view showing the drive into the film;

Figure 4 is a section taken on the line 4—4 of Figure 3 showing the arrangement of gears and other driving connections to the film;

Figure 5 is a plan view taken on the line 5—5 of Figure 2 and illustrates the trough in which the film runs, a light source and lens system;

Figure 6 is a view taken substantially along the line 6—6 of Figure 2 and illustrates the drive into the take-up reel;

Figure 7 is an elevational view showing a modified arrangement of the device wherein both of the reels are arranged to turn in the same direction;

Figure 8 is a view similar to Figure 6 but showing the drive in connection with the modification of Figure 8; and Figure 9 is an enlarged sectional view of the film guiding trough.

General arrangement

A device according to the preferred embodiment of this invention comprises a stand having a pair of reels supported thereby on a common axis. One of the reels forms a pay-off reel and film is led from this reel around a roller and thence vertically upwardly through a viewing station.

The viewing station comprises a light source adapted for passing light through the film and a lens system through which the illuminated film is viewed. The film in passing from the bottom of the viewing station upwardly, creates images which are erect and hence need not be inverted.

After the film has passed the viewing station, it is engaged by a sprocket from which it receives a power and thence passes over rollers to the take-up reel which is driven by friction means to maintain the film taut.

The reels and aforementioned rollers are inclined at various angles so that a compact structure results which causes the film to pass through the viewing station vertically and in a plane perpendicular to the line of sight of the observer.

The drive for the film comprises an intermittent drive mechanism operable during a portion of the time to shift the film one frame at a time along its path and, a greater portion of the time to retain the film stationary to be viewed. The net result is to create the same illusion of moving objects as is created by employing shutters and intermittent flashes of light in projecting equipment and film viewers according to the prior art.

According to another embodiment of this invention the reels are arranged to run in opposite directions and both are driven simultaneously with the driving of the film. The take-up reel is driven, as in the first modification, in a direction to take up the film while the pay-off reel is urged in the same direction, the pulling off of the film causing it to rotate in the opposite direction against the frictional drag of the driving means.

Structural arrangement

Referring to Figures 1 and 2, the device according to this invention comprises a stand 10 upon which are carried a pair of reels 12 and 14 of the usual type for carrying motion picture film of, say, 8 or 16 mm. width. The reel 14 is the pay-off reel and the film 16 wound thereon passes forwardly and around a roller 18 and thence upwardly to the viewing station generally indicated at 20. The reels 12 and 14 and the roller 18 are inclined at a compound angle from the axis of the stand 10 so that the film is presented substantially vertically and in a plane parallel to the observer to the viewing station.

After the film passes through the viewing station, it is engaged by a sprocket by which it is driven. The sprocket and its drive mechanism is better shown in Figures 3 and 4 wherein it will be seen that the sprocket 22 is mounted on a common shaft with a Geneva wheel 24 which is driven by the arm and roller mechanism at 26.

Secured to the arm 26 on a common center therewith is a pinion 28 adapted for meshing with a gear 30 keyed to the shaft 32. The shaft 32 carries a crank 34 by means of which the gear 30, the pinion 28, the arm 26 and the Geneva wheel 24 and sprocket 22 are driven. After the film has passed the sprocket, it passes under a roller 36 and over the inclined roller 38 to the take-up reel 12.

The take-up reel is driven by the mechanism shown in Figures 2, 4 and 6. The take-up reel 12 is mounted on a split shaft 40 carried in the journal 42 of the stand 10. The reel 12 is keyed to the shaft 40 and is retained thereon by the spring loaded latch mechanism at 44. Keyed to the shaft 40 is a pulley or sheave 46 around which passes a suitable friction driving member such as the spring belt illustrated in the drawings.

The spring belt passes forwardly, as viewed in Figure 2, and around a roller 48 and thence to a pulley 50 carried by the shaft 32.

Also carried in the journal 42 is a stub shaft 52 on which is mounted the pay-off reel 14. The pay-off reel 14 is keyed to the shaft 52 and is retained thereon by a latch mechanism similar to that shown on the shaft 40. The shaft 52 is retained in place by a set screw 54 which engages a groove in the said shaft. The shaft 52 also comprises a groove 56 which receives a rubber-like ring 58 which rests in a correspondingly shaped groove in the journal 42. The arrangement is such that the ring 58 provides for a predetermined amount of braking action of the shaft 52 thereby to prevent the reel 14 from running ahead of the drawing off of the film therefrom.

Thus, by rotating the crank 34, the take-up reel is driven while the film is simultaneously but intermittently passed before the viewing station. It will be noted that the Geneva mechanism comprises a six-slotted wheel so that the uniform rotation of the arm 26 will provide for the film to be stationary two-thirds of the time and to be moving one-third of the time. It will be evident that other Geneva mechanisms comprising a wheel with more slots could be employed if it were desired to increase the ratio between the stationary and moving times of the film.

Referring to Figures 5 and 9, the viewing station is more particularly shown. The frame which mounts the above described mechanism comprises a U-shaped member 60 open at the front and having attached thereto a plate 62 which has a trough 64 therein for receiving the film 16. The trough 64 is of the same width as the film to closely engage it along either edge thereof and comprises a recess 66 extending across the emulsion surface of the film. Inasmuch as it is contemplated to employ this viewer in connection with films having a single line of sprocket holes on one side and a sound track on the other side, the recess 66 includes an upstanding ledge or septum at 68 which engages the film between the sound track and the image portion thereof. The film is thus passed through the viewing station with neither the sound track nor the image portion in frictional engagement with any portion of the device.

The plate 62 has therein an aperture 70 at the viewing station which is in alignment with a light source 72 and a lens system 74, the latter comprising a pair of rectangular, double convex lenses which may be ground to compensating configurations according to practices well-known in the art if desired. Interposed between the light source 72 and the aperture 70 is a diffusing member 76 which may comprise frosted or opalescent glass in order to insure uniform illumination of the film.

The lens system at 74 is preferably mounted on a plate 78 which is hinged as at 80 to the U-shaped member 60 so that the lens system may be swung aside to permit film to be threaded through the machine.

For the purpose of retaining the film in working engagement with the sprocket, there is provided a pressure roller 82 which is carried on an arm 84 pivoted at 86 to an upstanding ear of the member 60. The upstanding ear of the member 60 may also comprise the bent-in tab 88 which provides an abutment for the screw 90 carried by the arm 84 thereby to adjust the position of the roller 82 relative to the sprocket 22. As in the case of the trough 64, the sprocket 22 may be centrally recessed as at 92 and have the narrow flange as at 94 so that the film is engaged by the sprocket only along its perforated edge and in the space between the sound track and the image portion.

In order to hold the film in alignment on the sprocket, the roller 82 may carry the flanges 96 which set on either side of the sprocket and which also engage the film along either edge thereof.

Referring to Figures 7 and 8, there is illustrated a somewhat modified arrangement wherein the film is taken from the pay-off reel in the opposite direction. In these views parts similar to those in the preceding views bear similar numbers with the addition of subscript *a*. In this modification there is provided the additional roller 100 for directing the film to the roller 18*a*.

The drive for the reels of the modification of Figure 7 is shown in Figure 8 wherein it will be seen that the reel 12 is keyed to a shaft 102 which is retained against axial movement by the set screw and groove arrangement at 104. The inner end of the shaft 102 has splined thereon a washer 106 which is urged by a spring plate 108 toward the sheave or pulley 46*a*.

The reel 14 is similarly mounted on a shaft 110 which carries the splined washer 112 which is urged toward the sheave 46*a* by the spring plate 114. When the sheave 46*a* is driven by the spring belt passing thereover it urges the take-up reel 12*a* in a direction to take up the film while the pay-off reel 14*a* is urged in a direction opposite to the travel of the film therefrom. Inasmuch as the film is positively driven by the sprocket, the frictional torque delivered to the reels is effective to maintain the film without slack throughout its travel.

Thus, it will be seen that this invention provides for an improved film viewer which eliminates shutters and flashing lights, and merely depends on varying movement of the film for creating a readable image.

While the apparatus of this invention has been set forth in connection with 8 and 16 mm. moving picture film including a sound track, it will be understood that any type of moving picture film with or without a sound track is adapted for use in this device and that ordinary camera films could also be viewed by intermittently moving the same from one frame to the next in the viewing station.

It will be apparent that the device of this invention is adapted for editing films in which case a cutting and splicing mechanism could be suitably associated with the stand 10 in a convenient location so that the film could be joined with another or have portions cut therefrom as desired by the operator.

It will be understood that various modifications and arrangement in structure could be made without departing from the spirit of my invention and, accordingly, I desire to comprehend such modifications and substitutions of equivalents as may be considered to come within the scope of the appended claims.

I claim:

1. In a film viewer; a base, reel supporting means carried by said base for supporting film carrying reels; reels mounted on said reel supporting means; a viewing station carried on said base; a plurality of idler rollers supported on said base and driving means operable to drive film from one of said reels to another through said viewing station, the axes of said reel supporting means and said idler rollers being disposed at angles in space relative to each other and to the plane of said viewing station which will cause the film to traverse a vertical, planar path through said viewing station.

2. In a film viewer; a pay-off reel; a take-up reel; a viewing station comprising lenses; means comprising a sprocket wheel for driving film from the pay-off reel toward the take-up reel; friction means connected with the driving means for the film for driving said take-up reel; and means comprising a plurality of rollers angularly disposed with respect to the axis of rotation of said sprocket wheel for directing the travel of said film, said pay-off and take-up reels being co-axially supported on shaft means which are also angularly disposed to the axis of rotation of said sprocket wheel.

3. In a film viewer; pay-off and take-up reels; a viewing station comprising a source of illumination, a lens system, and a vertically arranged film supporting trough between said source of illumination and said lens system; drive means including a Geneva mechanism for intermittently advancing the film through said viewing station; supporting shafts on a common axis for said reels and angularly disposed to the plane of said trough; and means comprising a plurality of idler rollers angularly disposed to the axis of said shafts and to the plane of said trough for guiding the film from the pay-off reel to said trough and from the trough to the take-up reel.

4. In a film viewer comprising a viewing station and a first support for a pay-off reel and a second support for a take-up reel, the said reels being adapted for supporting the film which is transferred through said viewing station, means for driving said film through said station for being viewed, friction drive means connected with said film driving means operable to drive said first support opposite to the direction of pay-off of the film therefrom and to drive said second support in a direction to turn the reel to take up film, said pay-off reel and take-up reel having a common axis angularly disposed to the shaft of said driving means and to the plane of said viewing station.

5. In a film viewer having a viewing station and a pay-off and a take-up reel; separate supporting shafts for said reels on a common axis; a single driving member between said shafts and frictionally associated with both thereof, said member being operable when driven to urge the take-up reel to take up film and to brake the pay-off reel, and said shafts being angularly disposed with respect to the plane of said viewing station.

6. In a film viewer, a base; a viewing station supported thereby comprising a lens system; a film support for supporting and guiding film vertically through the viewing station in alignment with the lens system; means for continuously illuminating the portion of the film in alignment with the lens system; means for initially positioning the film in the viewing station with one frame thereof in alignment with the lens system and for thereafter intermittently advancing the film to bring consecutive frames thereof into alignment with the lens system and for permitting the frames to dwell in alignment with the lens system; coaxial supporting means for supporting pay-off and take-up reels for carrying the film angularly positioned with respect to the plane of said viewing station; and means for continuously driving at least the support for the take-up reel.

FRANCIS B. MILLER.

REFERENCES CITED

The following references are of record in the file of this patent:

UNITED STATES PATENTS

| Number | Name | Date |
|---|---|---|
| 1,131,033 | Blackman | Mar. 9, 1915 |
| 1,287,353 | Larsen | Dec. 10, 1918 |
| 1,310,211 | Philpot | July 15, 1919 |
| 1,548,573 | Ackley | Aug. 4, 1925 |
| 1,573,825 | Grunfeld | Feb. 23, 1926 |
| 1,774,097 | Hauser et al. | Aug. 26, 1930 |
| 1,873,341 | Serrurier | Aug. 23, 1932 |
| 1,918,569 | Shapiro | July 18, 1933 |
| 1,941,676 | Frappier et al. | Jan. 2, 1934 |
| 1,942,929 | Larsen | Jan. 9, 1934 |
| 1,977,354 | Reynolds | Oct. 16, 1934 |
| 1,987,406 | May | Jan. 8, 1935 |
| 2,077,860 | Day | Apr. 20, 1937 |
| 2,089,275 | Lindstrom | Aug. 10, 1937 |

FOREIGN PATENTS

| Number | Country | Date |
|---|---|---|
| 171,818 | Great Britain | Dec. 1, 1921 |
| 358,663 | Germany | Sept. 15, 1922 |
| 528,196 | France | Aug. 11, 1921 |
| 644,324 | France | June 4, 1928 |
| 776,860 | France | Nov. 17, 1934 |